Dec. 22, 1925.

W. F. GODFREY 1,566,397

DOOR FOR AUTOMOBILE CURTAINS

Filed July 6, 1925

Inventor
William F. Godfrey.
By Adam E. Fisher.
Attorney

Patented Dec. 22, 1925.

1,566,397

UNITED STATES PATENT OFFICE.

WILLIAM F. GODFREY, OF KEARNEY, NEBRASKA.

DOOR FOR AUTOMOBILE CURTAINS.

Application filed July 6, 1925. Serial No. 41,578.

*To all whom it may concern:*

Be it known that WILLIAM F. GODFREY, a citizen of the United States, residing at Kearney, in the county of Buffalo and State of Nebraska, has invented certain new and useful Improvements in Doors for Automobile Curtains, of which the following is a specification.

This invention relates to the art of forming doors in automobile curtains; which curtains are ordinarily without doors and secured to the body of the car by means of snap fasteners, or the like, which must be released in order to enable the occupants of the car to get in or out of the vehicle.

It is the object of this invention, therefore, to provide a simple and practical method of forming a door in such curtains as are not equipped with doors.

In the drawing

Figure 1:
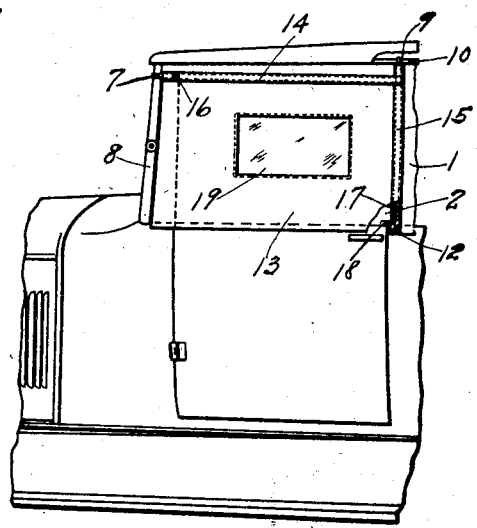
Figure 1 is a side elevation of a door, as formed in an automobile curtain by this method, the door being closed and regarded from outside the car.
Figure 2:
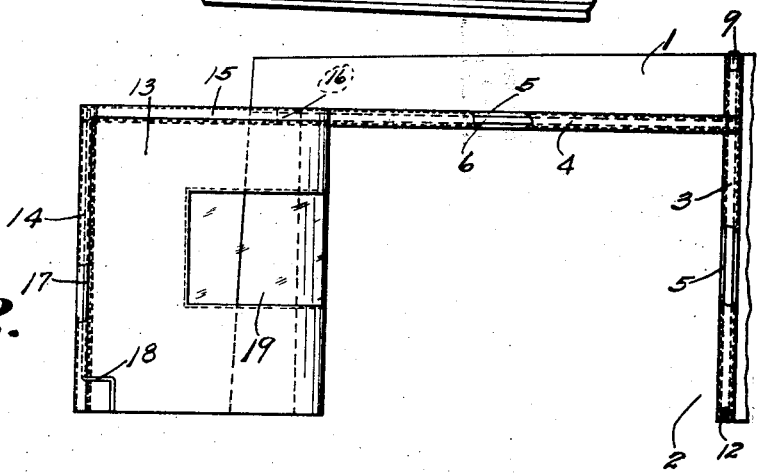
Figure 2 is a similar view, the door being open.
Figure 3:
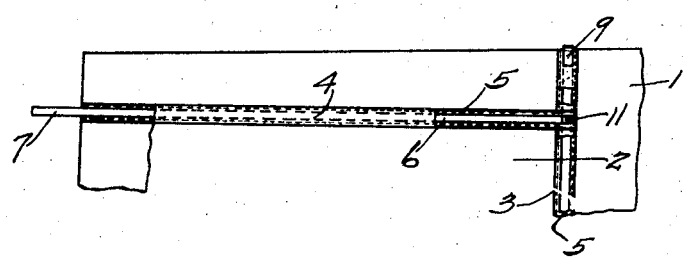
Figure 3 is a detail showing the method of incorporating the reinforcing strips in the curtain.

In carrying out this invention the curtain 1 is cut out to form a door-way 2. A side strip 3 of folded fabric is sewn along the side edge of the door opening to form a stiffened "jamb"; and a similar top strip 4 is sewn along the top edge of the opening. These strips 3 and 4 are preferably left hollow as shown at 5 so that reinforcing metal strips may be run through them if desired; and in fact it is better to so reinforce the top strip 4, anyway, with such flat metal strip, as shown at 6. The forward end 7 of the strip 6 is extended free of the curtain 1 and is bent around the windshield post 8 as shown and thus acts as a support for the entire door. A flat metal hook 9 is riveted to the upper end of the strip 3 and adapted to engage the upper horizontal top bow or rib 10 of the automobile top frame. The shank of the hook 9 is disposed under the inner end of the top strip 4 and the inner end of the reinforcing strip 6 is riveted at 11 to the shank of the hook 9. The lower end of the strip 3 is releasably secured to the body of the car by means of a "lift-a-dot" fastener 12. Thus the doorway is substantially supported. A door flap 13 of suitable fabric material is provided and is reinforced at its side and top edges by folded fabric strips 14 and 15, similar to the strips 3 and 4 of the doorway; and it is "hung" in place in the door-way 2 by merely sewing it by an upper corner of the "hinge" side to the top strip 4, as shown at 16. The usual supporting rod 17, having the offset 18, is passed up within the fold of the strip 14, the offset lower end thereof being adapted to pass into the usual door socket of the car door; whereby the flap 13 is properly supported and is adapted to open with the car door. A window 19 may be mounted in the flap 13.

While I have herein described a certain specific manner and method of constructing and assembling the elements of my invention, it is understood that I may vary from the same in minor details, not departing from the spirit of my invention, so as best to construct a practical device for the purpose intended, as defined in the appended claims.

I claim:

1. The described method of forming a flap door in an automobile curtain; consisting in cutting out a door-way from the curtain; sewing stiffening strips at the top and side edge of the opening; extending a metal reinforcing strip through the top stiffening strip and bending the forward end thereof around the windshield post; sewing a metal hook to the said side edge stiffening strip, the said hook being adapted to engage the upper bow of the top frame of the automobile; riveting together the shank of the said hook and the inner end of the said top edge reinforcing strip; hinging a flap door over the said door opening by sewing it by an upper corner of the hinge side to the said top stiffening strip of the door-way; the said flap door having supporting means engaging the door of the automobile.

2. A flap door equipment for the curtain of an automobile, the said curtain having a door-way cut therein, the top and side edges thereof being strengthened, the side edge having means at its lower end for releasably engaging the body of the automobile; the said equipment comprising a reinforcing metal strip in the top edge of the door-way, the forward end of the strip being bent around the windshield post of the automobile; a metal hook having a shank secured to the upper end of the side edge of the door-way and to the inner end of the said reinforcing metal strip of the top edge of the door-way, the said hook being adapted to engage the upper bow of the top frame of the automobile; and a flap door hinged over the said door-way, the said flap door being of fabric material, stiffened at top and side edges, and having means at its side edge for engaging the door of the automobile, whereby it is supported by the door of the automobile.

In testimony whereof I affix my signature.

WILLIAM F. GODFREY.